United States Patent
Dirks et al.

(10) Patent No.: US 7,959,111 B1
(45) Date of Patent: Jun. 14, 2011

(54) ANGLE OF ATTACK AUTOMATED FLIGHT CONTROL SYSTEM VERTICAL CONTROL FUNCTION

(75) Inventors: Charles Bradford Dirks, Swisher, IA (US); Michael James Krenz, Cedar Rapids, IA (US); John Evan Van Rheenen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 447 days.

(21) Appl. No.: 11/729,729

(22) Filed: Mar. 29, 2007

(51) Int. Cl.
*G05D 1/08* (2006.01)

(52) U.S. Cl. .......................... 244/181; 244/183; 244/188

(58) Field of Classification Search .................. 244/180, 244/181, 183, 186, 188
See application file for complete search history.

(56) References Cited

U.S. PATENT DOCUMENTS

| | | | | |
|---|---|---|---|---|
| 2,677,513 A | * | 5/1954 | Kliever | 244/181 |
| 2,774,558 A | * | 12/1956 | Alderson | 244/188 |
| 2,853,254 A | * | 9/1958 | Alderson | 244/181 |
| 3,128,967 A | * | 4/1964 | Hays, Jr. | 244/181 |
| 3,241,792 A | * | 3/1966 | Hattendorf | 244/181 |
| 3,265,334 A | * | 8/1966 | Neuendorf et al. | 244/188 |
| 3,681,580 A | * | 8/1972 | Gwathmey et al. | 701/6 |
| 3,714,825 A | * | 2/1973 | Melvin | 73/178 T |
| 6,089,503 A | * | 7/2000 | Volk | 244/48 |

OTHER PUBLICATIONS

Gee, Shu W., et al. Flight Evaluation of angle of attack as a control parameter in general-aviation aircraft. NASA technical note D-6210. Mar. 1971.*

* cited by examiner

*Primary Examiner* — Tien Dinh
*Assistant Examiner* — Michael Kreiner
(74) *Attorney, Agent, or Firm* — Matthew J. Evans; Daniel M. Barbieri

(57) ABSTRACT

The present invention is directed to an AOA (angle of attack) vertical control function for an AFCS (automated flight control system) for an aircraft. The AOA vertical control function of the AFCS causes the aircraft to climb or descend while maintaining the aircraft at a constant AOA. The AFCS may maintain the constant AOA despite changing air data parameters by increasing or decreasing the thrust of the aircraft, the pitch angle of the aircraft, or the angle of incidence of the aircraft wing. By utilizing AOA, an aircraft can be safely directed to automatically climb or descend to any altitude the aircraft is capable of reaching without the risk of stall (unlike Vertical Speed Mode) or the irritation of the FLCH (Flight Level Change) Mode erratic climb.

21 Claims, 4 Drawing Sheets

ANGLE OF ATTACK AUTOMATED FLIGHT CONTROL SYSTEM VERTICAL CONTROL FUNCTION

FIELD OF THE INVENTION

The present invention relates generally to automatic flight control and more particularly to an AOA (angle of attack) AFCS (automatic flight control system) vertical control function.

BACKGROUND OF THE INVENTION

Currently, AFCS (Automated Flight Control Systems) in business class jets operate with two fundamental climb functions, Vertical Speed and Flight Level Change (FLCH).

Vertical Speed Mode is commonly utilized to provide a constant feet per minute rate of climb (vertical speed) based on a manual selection by the pilot. While this is an effective method to climb while the autopilot is engaged, it requires constant input from the pilot to adjust climb rates to ensure safe attitudes (the relation of an aircraft to its surroundings such as air flow and gravity, particularly the orientation of the aircraft with respect to the horizon) as the aircraft climbs through higher altitudes. If the Vertical Speed selection is left unattended, the airplane will attempt to maintain the climb rate through attitude adjustment with no regards to diminishing speed. Subsequently, it is quite possible to achieve a high altitude stall if the pilot is distracted and forgets to adjust the Vertical Speed according to aircraft altitude and performance.

FLCH Mode is frequently taught by training organizations as the primary method to climb via the AFCS because it maintains a constant air speed during the climb. This method virtually eliminates the possibility of stalling the aircraft during the climb through the flight levels. Unfortunately, the FLCH Mode cannot accommodate the constantly changing air data parameters affecting the aircraft speed through the air. Consequently, during a FLCH selected climb, the aircraft tends to oscillate up and down on the pitch axis (the orientation of the aircraft's longitudinal axis, whether the aircraft's nose is pointing up, down, or level with the horizon) in an effort to maintain a constant air speed through constantly changing temperatures at altitude. The result is an extremely erratic climb and a sometimes uncomfortable ride for the crew and passengers.

Consequently, it would be desirable to provide an automatic flight control system vertical control function which does not suffer from the drawbacks of Vertical Speed Mode and FLCH Mode.

SUMMARY OF THE INVENTION

Accordingly, the present invention is directed to an AOA (angle of attack) vertical control function for an AFCS (automated flight control system) for an aircraft which does not suffer from the drawbacks of Vertical Speed Mode and FLCH (Flight Level Change) Mode.

The AOA vertical control function of the AFCS causes the aircraft to climb or descend while maintaining the aircraft at a constant AOA. The AFCS receives the constant AOA at which to maintain the aircraft during the vertical control function from the user of the aircraft. The AFCS receives the AOA of the aircraft from an AOA system.

The AFCS may maintain the constant AOA despite changing air data parameters by increasing or decreasing the thrust of the aircraft, the pitch angle of the aircraft, or the angle of incidence of the aircraft. All other factors remaining static, increasing thrust of an aircraft correspondingly reduces AOA and decreasing thrust of an aircraft correspondingly increases AOA. Increasing the pitch angle of the aircraft correspondingly increases AOA and decreasing the pitch angle of the aircraft correspondingly decreases AOA. Increasing the angle of incidence of the aircraft correspondingly increases AOA and decreasing the angle of incidence of the aircraft correspondingly decreases AOA.

By utilizing AOA, an aircraft can be safely directed to automatically climb or descend to any altitude the aircraft is capable of reaching without the risk of stall (unlike Vertical Speed Mode) or the irritation of the FLCH (Flight Level Change) Mode erratic climb.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figure 1:
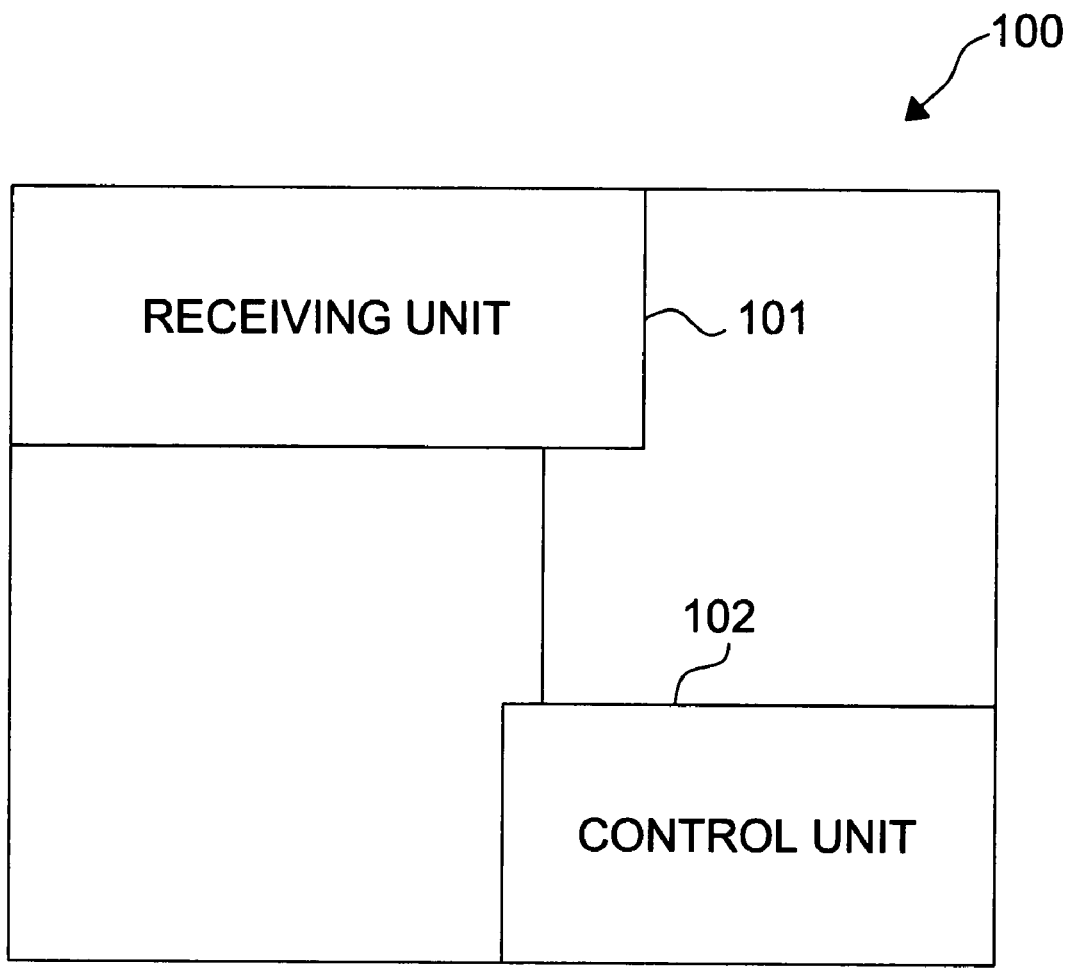
FIG. 1 is a block diagram illustrating an AFCS for an aircraft, in accordance with an exemplary embodiment of the present invention.

Referring generally to FIG. 1; an AFCS (automated flight control system) 100 for an aircraft, in accordance with an exemplary embodiment of the present invention, is illustrated. The aircraft may include an automatic throttle. The angle of incidence of the aircraft may be adjustable by the AFCS 100. The angle of incidence of the aircraft may be adjustable by changing the effective wing shape by controlling either movable wing devices (such as auto-slats, flaps, or the like) or the wing sweep angle. The AFCS 100 comprises a receiving unit 101 for receiving an AOA (angle of attack) for the aircraft. The AFCS 100 further comprises a control unit 102. The AFCS 100 includes a vertical control function wherein the control unit 102 causes the aircraft to climb or descend while maintaining the aircraft at a constant AOA. The AFCS 100 may receive the constant AOA to maintain the aircraft at during the climb function from the user of the aircraft.

AOA is the angle between the chord line of an aircraft's wing and the direction of the air stream. AOA is related to the lift generated by the wing, with greater angles producing greater lift and also greater drag. However, a stall (sudden reduction in lift generated by an airfoil when the critical AOA is exceeded) point is where the AOA is so great that the air stream starts to separate, decreasing lift. The chord of an aircraft's wing is the distance between the leading and trailing edges of the wing, measured in the direction of the normal air flow.

AOA for an aircraft may be influenced by the thrust of the aircraft, the pitch angle of the aircraft, and the angle of incidence of the aircraft. The thrust of an aircraft is the reactive force which propels the aircraft. The pitch angle of an aircraft is the orientation of the aircraft's longitudinal axis, whether the nose of the aircraft is pointing upwards, level, or downwards. The angle of incidence of an aircraft is the angle between the aircraft wing chord and the longitudinal axis of the aircraft.

The control unit 102 may maintain the constant AOA despite changing air data parameters by increasing or decreasing the thrust of the aircraft, the pitch angle of the aircraft, or the angle of incidence of the aircraft. All other factors remaining static, increasing thrust of an aircraft correspondingly reduces AOA and decreasing thrust of an aircraft correspondingly increases AOA. Increasing the pitch angle of the aircraft correspondingly increases AOA and decreasing the pitch angle of the aircraft correspondingly decreases AOA. Increasing the angle of incidence of the aircraft correspondingly increases AOA and decreasing the angle of incidence of the aircraft correspondingly decreases AOA. The control unit 102 may maintain the constant AOA by first increasing or decreasing the thrust of the aircraft until the aircraft has no excess thrust remaining and then by decreasing or increasing the pitch angle of the aircraft.

For example, a common practice in business aviation is not to exceed 0.4 AOA during a climb though flight levels. This ensures a strong safety margin against upset and also provides for adequate aircraft energy upon reaching a desired flight level to accelerate to its MACH level performance capability. In this instance, the pilot of the aircraft could select an AOA vertical control on the AFCS 100 with a 0.4 AOA and the AFCS 100 would cause the aircraft to climb while maintaining this conservative climb, thus providing a high degree of stability and safety during the climb.

Figure 2:
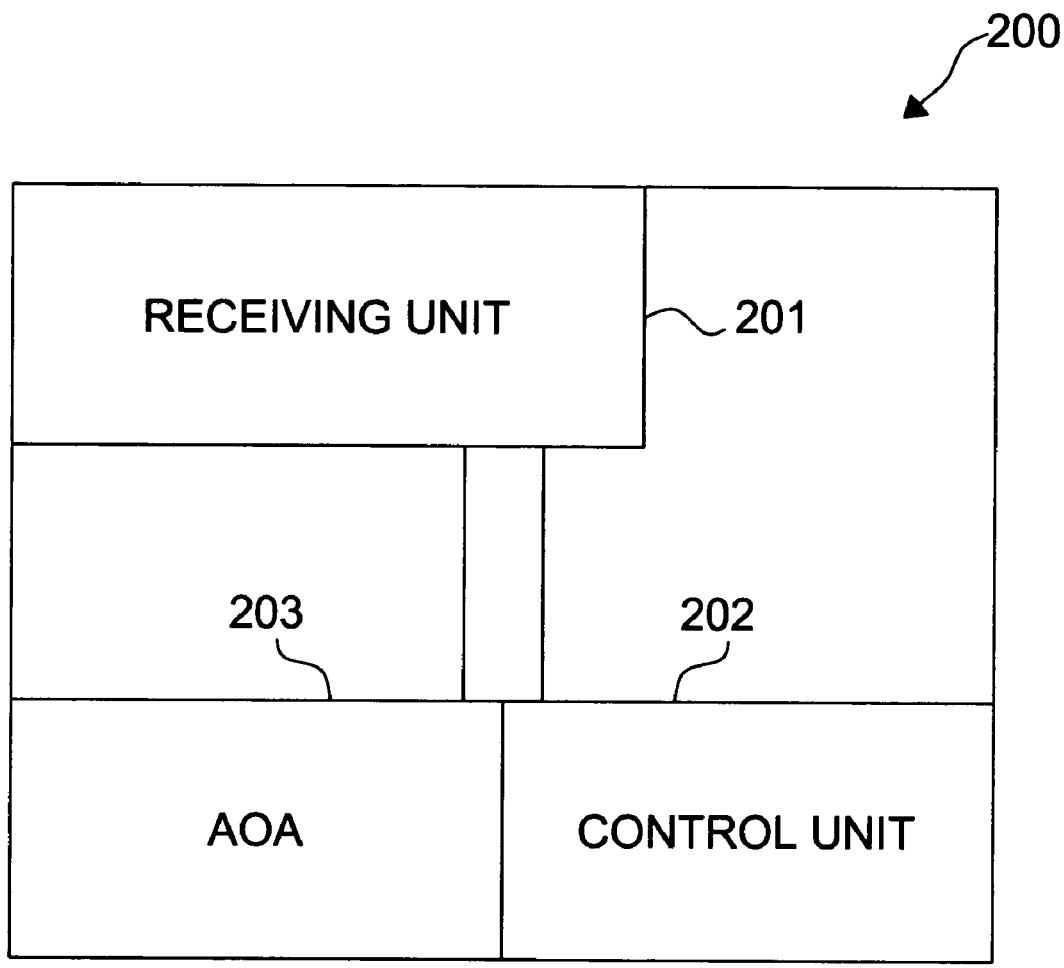
FIG. 2 is a block diagram illustrating an AFCS for an aircraft, in accordance with an alternative embodiment of the present invention.

Referring generally to FIG. 2; an AFCS (automated flight control system) 100 for an aircraft, in accordance with an alternative embodiment of the present invention, is illustrated. The AFCS 200 comprises a receiving unit 201 for receiving an AOA (angle of attack) for the aircraft. The AFCS 200 further comprises a control unit 202 and an AOA system 203. The receiving unit 201 receives the AOA for the aircraft from the AOA system 203. The AFCS 200 includes a vertical control function wherein the control unit 202 causes the aircraft to climb or descend while maintaining the aircraft at a constant AOA. The AFCS 200 may receive the constant AOA to maintain the aircraft at during the vertical control function from the user of the aircraft. The control unit 202 may maintain the constant AOA despite changing air data parameters by increasing or decreasing the thrust of the aircraft, the pitch angle of the aircraft, or the angle of incidence of the aircraft. The control unit 202 may maintain the constant AOA by first increasing or decreasing the thrust of the aircraft until the aircraft has no excess thrust remaining and then by decreasing or increasing the pitch angle of the aircraft.

Figure 3:
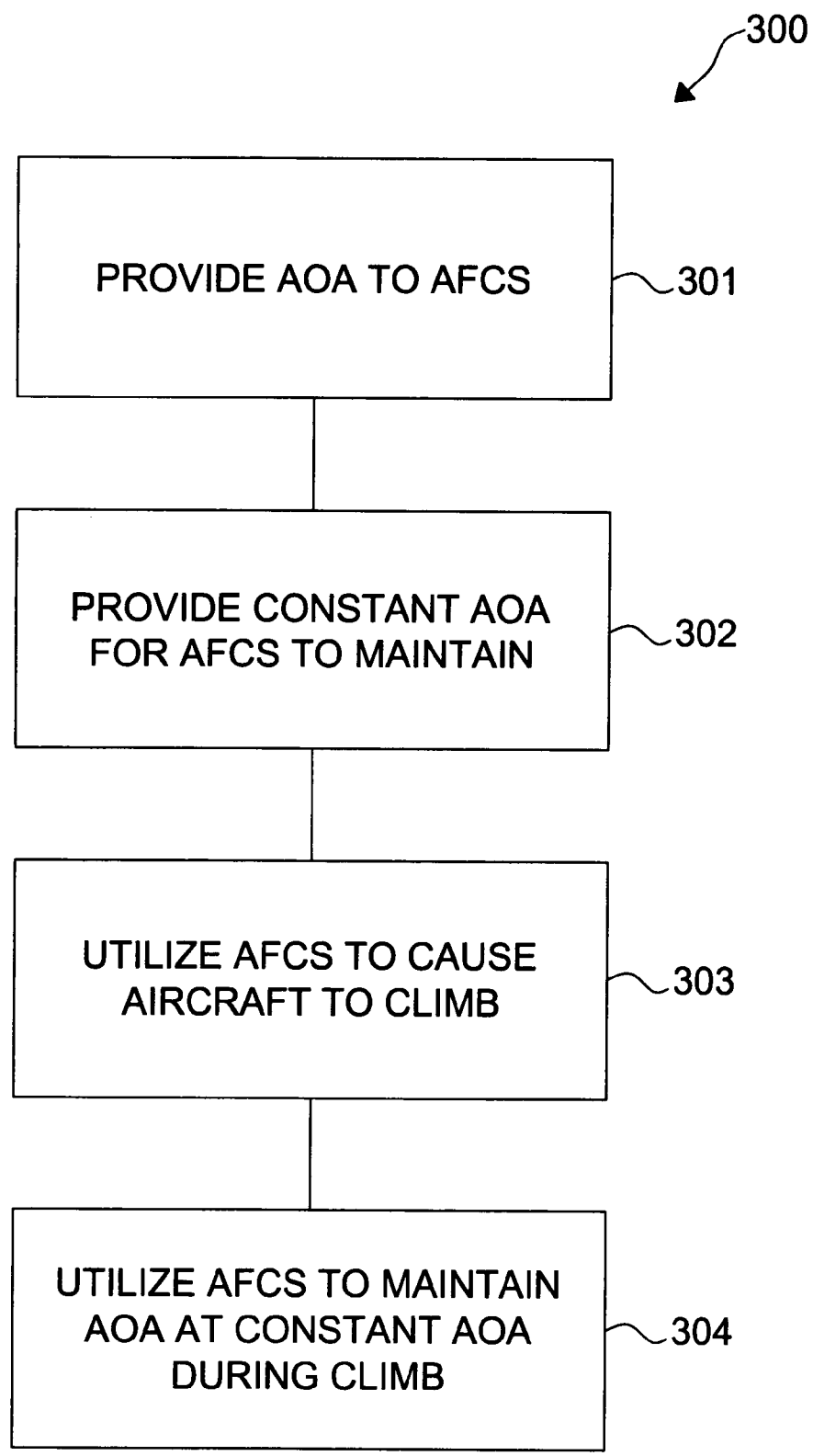
FIG. 3 is a flow chart illustrating a method of performing a vertical control function for an aircraft utilizing an AFCS, in accordance with an exemplary embodiment of the present invention.

Referring now to FIG. 3; a method 300 of performing a vertical control function for an aircraft utilizing an AFCS, in accordance with an exemplary embodiment of the present invention, is shown. The aircraft may include an automatic throttle. The angle of incidence of the aircraft may be adjustable by the AFCS. The angle of incidence of the aircraft may be adjustable by changing the effective wing shape by controlling either movable wing devices (such as auto-slats, flaps, or the like) or the wing sweep angle. In step 301, an AOA for the aircraft is provided to the AFCS. The AOA for the aircraft may be provided by an AOA system. In step 302, a constant AOA for the AFCS to maintain is provided to the AFCS. The constant AOA for the AFCS to maintain may be provided to the AFCS by the user of the aircraft. In step 303, the AFCS is utilized to cause the aircraft to climb or descend. In step 304, the AFCS is utilized to maintain the AOA for the aircraft at the constant AOA during the climb/descent. The AFCS may maintain the constant AOA despite changing air data parameters by increasing or decreasing the thrust of the aircraft, the pitch angle of the aircraft, or the angle of incidence of the aircraft. The AFCS may maintain the constant AOA by first increasing or decreasing the thrust of the aircraft until the aircraft has no excess thrust remaining and then by decreasing or increasing the pitch angle of the aircraft.

Figure 4:
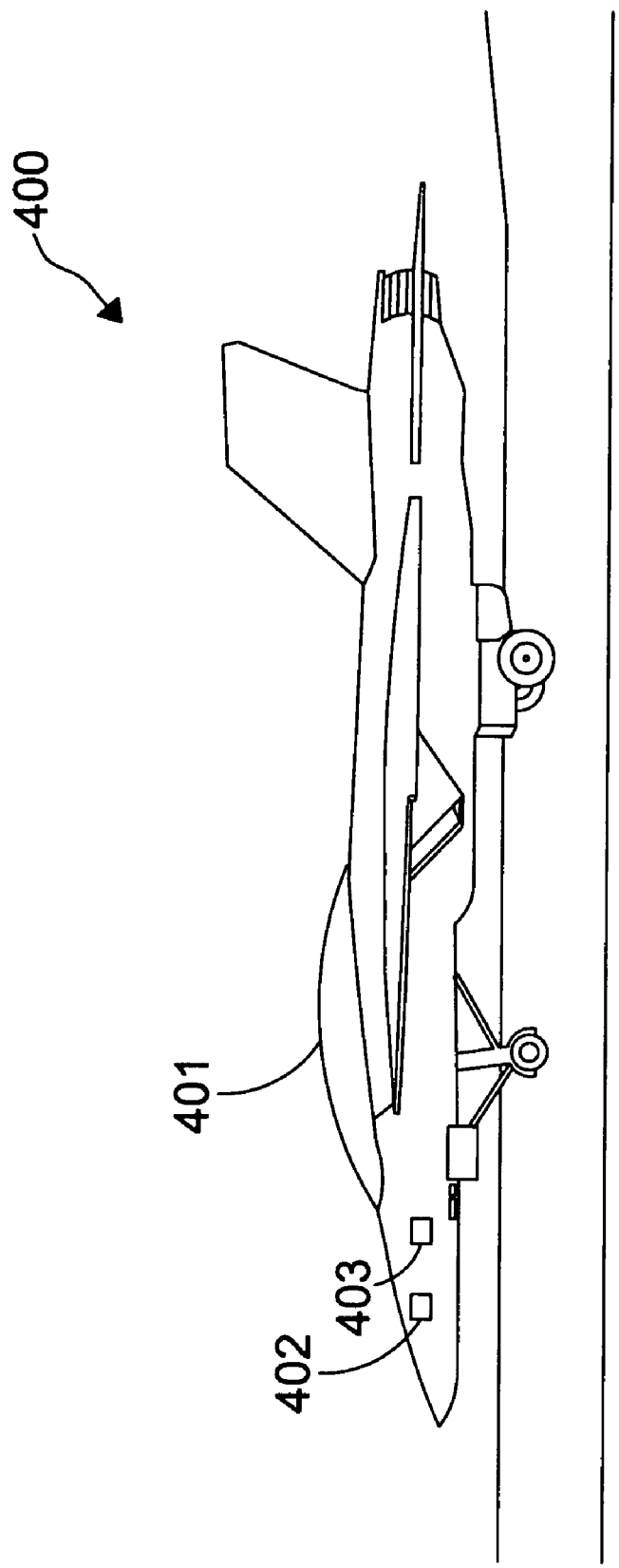
FIG. 4 is a diagram illustrating a system for performing a vertical control function, in accordance with an alternative embodiment of the present invention.

Referring now to FIG. 4, a system 400 for performing a vertical control function, in accordance with an alternative embodiment of the present invention, is shown. The system 400 includes an aircraft 401, an AFCS 402, and an AOA system 403. The aircraft may include an automatic throttle. The angle of incidence of the aircraft 401 may be adjustable by the AFCS 402. The angle of incidence of the aircraft 401 may be adjustable by changing the effective wing shape by controlling either movable wing devices (such as auto-slats, flaps, or the like) or the wing sweep angle. The AOA system 403 provides an AOA for the aircraft 401 to the AFCS 402. The AFCS 402 causes the aircraft 401 to climb or descend while maintaining a constant AOA. The constant AOA for the aircraft 401 may be provided to the AFCS 402 by the user of the aircraft 401. The AFCS 402 may maintain the constant AOA despite changing air data parameters by increasing or decreasing the thrust of the aircraft 401, the pitch angle of the aircraft 401, or the angle of incidence of the aircraft 401. The AFCS 402 may maintain the constant AOA by first increasing or decreasing the thrust of the aircraft 401 until the aircraft 401 has no excess thrust remaining and then by decreasing or increasing the pitch angle of the aircraft 401.

The present invention provides an AOA vertical control function for an AFCS. By utilizing AOA, an aircraft can be safely directed to automatically climb or descend to any altitude the aircraft is capable of reaching without the risk of stall (unlike Vertical Speed Mode) or the irritation of the FLCH (Flight Level Change) Mode erratic climb.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged white remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An AFCS (automated flight control system) for an aircraft, comprising:
   a receiving unit, the receiving unit receiving an angle of attack for the aircraft during at least one of: a climb of the aircraft and a descent of the aircraft; and
   a control unit, the control unit being communicatively coupled to the receiving unit, the control unit being configured for receiving the angle of attack from the receiving unit, the control unit being further configured for receiving an user-provided angle of attack, the control unit being further configured for comparing the user-provided angle of attack to the angle of attack received from the receiving unit, the control unit, based upon said comparison and during at least one of: the climb of the aircraft and the descent of the aircraft, being further configured for maintaining the user-provided angle of attack by separately controlling:
   an angle of incidence of the aircraft, the angle of incidence of the aircraft representing an angle between an aircraft wing chord and a longitudinal axis of the aircraft;
   a thrust of the aircraft; and
   a pitch angle of the aircraft, the pitch angle of the aircraft representing an orientation of the longitudinal axis of the aircraft.

2. The AFCS as claimed in claim 1, wherein the control unit is configured for increasing the thrust of the aircraft.

3. The AFCS as claimed in claim 1, wherein the control unit is configured for decreasing the thrust of the aircraft.

4. The AFCS as claimed in claim 1, wherein the control unit is configured for increasing the pitch angle of the aircraft.

5. The AFCS as claimed in claim 1, wherein the control unit is configured for decreasing the pitch angle of the aircraft.

6. The AFCS as claimed in claim 1, wherein the control unit is configured for maintaining the user-provided angle of attack by decreasing the thrust of the aircraft to a minimum thrust level, then increasing the pitch angle of the aircraft, then increasing the angle of incidence of the aircraft.

7. The AFCS as claimed in claim 1, wherein the control unit is configured for maintaining the user-provided angle of attack by increasing the thrust of the aircraft until the aircraft has no excess thrust remaining, then decreasing the pitch angle of the aircraft, then decreasing the angle of incidence of the aircraft.

8. The AFCS as claimed in claim 1, wherein the control unit is configured for maintaining the user-provided angle of attack by increasing the thrust of the aircraft until the aircraft has no excess thrust remaining and then decreasing the pitch angle of the aircraft.

9. The AFCS as claimed in claim 1, wherein the control unit is configured for maintaining the user-provided angle of attack by decreasing the thrust of the aircraft to a minimum thrust level and then increasing the pitch angle of the aircraft.

10. The AFCS as claimed in claim 1, wherein the AFCS further comprises an AOA (angle of attack) system coupled to the receiving unit and the receiving unit receives the angle of attack for the aircraft from the AOA system.

11. A method of performing a vertical control function for an aircraft during at least one of: a climb of the aircraft and a descent of the aircraft, said method being performed by an AFCS (automated flight control system), said method comprising the steps of:
    receiving an angle of attack for the aircraft at a receiving unit of the AFCS;
    receiving a user-provided angle of attack for the aircraft at a control unit of the AFCS;
    comparing the received angle of attack to the user-provided angle of attack;
    based upon said comparison and during at least one of: the climb of the aircraft and the descent of the aircraft, maintaining the user-provided angle of attack by separately controlling:
    an angle of incidence of the aircraft, the angle of incidence of the aircraft representing an angle between an aircraft wing chord and a longitudinal axis of the aircraft;
    a thrust of the aircraft; and
    a pitch angle of the aircraft, the pitch angle of the aircraft representing an orientation of the longitudinal axis of the aircraft.

12. The method of claim 11, wherein controlling the thrust of the aircraft includes increasing the thrust of the aircraft.

13. The method of claim 11, wherein controlling the thrust of the aircraft includes decreasing the thrust of the aircraft.

14. The method of claim 11, wherein controlling the pitch angle of the aircraft includes increasing the pitch angle of the aircraft.

15. The method of claim 11, wherein controlling the pitch angle of the aircraft includes decreasing the pitch angle of the aircraft.

16. The method of claim 11, wherein the user-provided angle of attack is maintained by decreasing the thrust of the aircraft to a minimum thrust level, then increasing the pitch angle of the aircraft, then increasing the angle of incidence of the aircraft.

17. The method of claim 11, wherein the user-provided angle of attack is maintained by increasing the thrust of the aircraft until the aircraft has no excess thrust remaining, then decreasing the pitch angle of the aircraft, then decreasing the angle of incidence of the aircraft.

18. The method of claim 11, wherein controlling the thrust of the aircraft and controlling the pitch angle of the aircraft include increasing the thrust of the aircraft until the aircraft has no excess thrust remaining and then decreasing the pitch angle of the aircraft.

19. The method of claim 11, wherein controlling the thrust of the aircraft and controlling the pitch angle of the aircraft include decreasing the thrust of the aircraft to a minimum thrust level and then increasing the pitch angle of the aircraft.

20. The method of claim 11, wherein the step of providing an angle of attack for the aircraft to the AFCS is performed utilizing an AOA (angle of attack) system.

21. A system for performing a vertical control function, comprising:
    an aircraft;
    an AFCS (automated flight control system); and
    an AOA (angle of attack) system;
    wherein the AOA system provides an angle of attack for the aircraft to the AFCS and the AFCS causes the aircraft to perform one selected from a climb and descent while maintaining a constant angle of attack provided by a user of the aircraft, wherein the AFCS in response to the angle of attack provided by the AOA system is configured to separately control:
    an angle of incidence of the aircraft, the angle of incidence of the aircraft representing an angle between an aircraft wing chord and a longitudinal axis of the aircraft;
    a thrust of the aircraft; and
    a pitch angle of the aircraft, the pitch angle of the aircraft representing an orientation of the longitudinal axis of the aircraft.

* * * * *